US012685973B2

(12) United States Patent
Greenberg et al.

(10) Patent No.: US 12,685,973 B2
(45) Date of Patent: Jul. 21, 2026

(54) BEVERAGE MACHINE

(71) Applicants: Marmon Foodservice Technologies, Inc., Osseo, MN (US); Cornelius (Tianjin) Co., Ltd., Tianjin (CN)

(72) Inventors: Jacob C. Greenberg, Elgin, IL (US); Nicholas M. Giardino, South Elgin, IL (US); Yulong Liu, Tianjin (CN); Wei Xing, Tianjin (CN); Qi Zheng, Tianjin (CN); Weidong Song, Tianjin (CN); Wenzhai Su, Tianjin (CN); Peiyuan Yang, Tianjin (CN); Tinghao Chen, Tianjin (CN)

(73) Assignees: Marmon Foodservice Technologies, Inc., Osseo, MN (US); Cornelius (Tianjin) Co., Ltd., Tianjin (CN)

( * ) Notice: Subject to any disclaimer, the term of this patent is extended or adjusted under 35 U.S.C. 154(b) by 407 days.

(21) Appl. No.: 18/499,064

(22) Filed: Oct. 31, 2023

(65) Prior Publication Data

US 2024/0139693 A1 May 2, 2024

(30) Foreign Application Priority Data

Nov. 1, 2022 (CN) ......................... 202222932080.7

(51) Int. Cl.
*B01F 23/236* (2022.01)
*B01F 23/232* (2022.01)
(Continued)

(52) U.S. Cl.
CPC ........ *B01F 23/2362* (2022.01); *B01F 23/232* (2022.01); *B67D 1/0057* (2013.01);
(Continued)

(58) Field of Classification Search
CPC .. B67D 1/0051; B67D 1/0046; B67D 1/0021; B67D 1/0071; B67D 1/0066;
(Continued)

(56) References Cited

U.S. PATENT DOCUMENTS 5,249,710 A 10/1993 Hassell et al.
5,319,947 A 6/1994 Fischer
(Continued)

FOREIGN PATENT DOCUMENTS

CN 109700315 5/2019
CN 109700315 A * 5/2019
(Continued)

OTHER PUBLICATIONS

Decision to Grant for Korean Patent Appl. No. 20-2023-0001083, dated Jun. 18, 2025.

*Primary Examiner* — Jennifer Dieterle
*Assistant Examiner* — Rachel Marie Slaugovsky
(74) *Attorney, Agent, or Firm* — Andrus Intellectual Property Law, LLP

(57) ABSTRACT

A gas infusion tank for a beverage machine includes a tank body defining a holding space for accommodating beverages. A mixing element includes a mixing chamber, an ascending pipe, and a descending pipe. A top of the ascending pipe is fluidly connected to the mixing chamber and a bottom of the ascending pipe has a liquid inlet. The liquid inlet is fluidly connected to the holding space. A top of the descending pipe is fluidly connected to the mixing chamber and a bottom of the descending pipe includes a liquid outlet in fluid communication with the nozzle. A gas intake hole connects the holding space with the mixing chamber.

19 Claims, 8 Drawing Sheets

100

(51) Int. Cl.

| | |
|---|---|
| ***B67D 1/00*** | (2006.01) |
| ***B67D 1/08*** | (2006.01) |
| *B01F 101/14* | (2022.01) |

(52) U.S. Cl.

CPC ............. *B67D 1/08* (2013.01); *B67D 1/0801* (2013.01); *B01F 2101/14* (2022.01)

(58) Field of Classification Search

CPC ............... B67D 2001/0091; A23L 2/54; B01F 23/2363; B01F 25/3121

USPC ............................................... 222/145.5, 394

See application file for complete search history.

(56) References Cited

U.S. PATENT DOCUMENTS

| | | | |
|---|---|---|---|
| 5,350,086 | A | 9/1994 | Martin et al. |
| 5,433,348 | A | 7/1995 | Deering et al. |
| 5,487,492 | A | 1/1996 | Goulet |
| 6,045,007 | A | 4/2000 | Simmons |
| 6,155,069 | A | 12/2000 | Quartarone et al. |
| 6,463,753 | B1 | 10/2002 | Haskayne |
| 6,505,758 | B2 | 1/2003 | Black et al. |
| 6,574,981 | B2 | 6/2003 | Schroeder |
| 6,626,005 | B2 | 9/2003 | Schroeder |
| 6,712,342 | B2 | 3/2004 | Bosko |
| 6,761,036 | B2 | 7/2004 | Teague et al. |
| 6,945,070 | B1 | 9/2005 | Jablonski et al. |
| 7,624,895 | B2 | 12/2009 | Haskayne |
| 7,641,074 | B2 | 1/2010 | Edwards et al. |
| 7,757,498 | B2 | 7/2010 | Wolski et al. |
| 7,793,678 | B2 | 9/2010 | Edwards et al. |
| 8,074,842 | B2 | 12/2011 | Edwards et al. |
| 8,251,259 | B2 | 8/2012 | Edwards et al. |
| 8,365,956 | B2 | 2/2013 | Edwards et al. |
| 8,365,957 | B2 | 2/2013 | Edwards et al. |
| 8,490,834 | B2 | 7/2013 | Edwards et al. |
| 9,085,451 | B2 | 7/2015 | Santy |
| 9,718,035 | B2 | 8/2017 | Bandixen et al. |
| 10,278,533 | B2 | 5/2019 | Angell et al. |
| 10,351,411 | B2 | 7/2019 | Ziesel |
| 10,477,883 | B2 | 11/2019 | Giardino et al. |
| 10,625,219 | B2 | 4/2020 | Bandixen et al. |
| 10,785,996 | B2 | 9/2020 | Giardino et al. |
| 10,865,090 | B2 | 12/2020 | Ziesel |
| 10,940,450 | B2 | 3/2021 | Wiemer |
| 11,013,247 | B2 | 5/2021 | Giardino et al. |
| 11,040,314 | B2 | 6/2021 | Giardino et al. |
| 11,612,864 | B2 | 3/2023 | Yang et al. |
| 11,613,454 | B2 | 3/2023 | Sevcik |
| 11,617,994 | B2 | 4/2023 | Humphrey et al. |
| 2006/0071015 | A1 | 4/2006 | Jablonski |
| 2017/0304784 | A1 | 10/2017 | Kasprzycki |
| 2019/0031485 | A1 | 1/2019 | Krüger |

FOREIGN PATENT DOCUMENTS

| | | | |
|---|---|---|---|
| CN | 218683765 | | 3/2023 |
| JP | 2007514468 | A | 6/2007 |
| KR | 20150145555 | A | 12/2015 |
| KR | 20190034692 | A | 4/2019 |
| KR | 102227748 | B1 | 3/2021 |
| WO | 2020160420 | | 8/2020 |

* cited by examiner

BEVERAGE MACHINE

CROSS-REFERENCE TO RELATED APPLICATIONS

The present application claims priority of Chinese Patent Application No. ZL202222932080.7, filed on Nov. 1, 2022, and which granted on Mar. 24, 2023 as patent number CN 218683765U, the contents of which is hereby incorporated by reference in entirety.

FIELD OF THE DISCLOSURE

The present disclosure relates to the technical field of beverage dispensing machines. More specifically, the present disclosure relates to gas infusion for utensils, in particular to a beverage machine.

BACKGROUND

In existing beverage dispensing machines, mixing devices are used to mix beverage and gas. Gas and liquid beverage are directly passed into a mixing container with a larger capacity, and the gas is pressed into the beverage by using a higher gas pressure. However, the effectiveness of this approach is limited. There are also some mixing devices that utilize the fluidity of gas and beverages and mix the gas into the beverage by increasing the contact between the gas and the beverage. However, the existing mixing devices that use gas-liquid flow are often realized with complex mechanical systems which increases the size of the device and installation, use, and maintenance can be complicated. Therefore, the inventors have endeavored to improve upon those existing solutions.

BRIEF DISCLOSURE

A series of concepts in simplified form are introduced herein, which will be further explained in detail in the detailed description section. This section does not necessarily imply the scope of protection or the technical solution sought to be protected herein.

The present application discloses a beverage machine with a gas mixing device. The gas mixing device includes a tank body, a valve mouth, a flow mixing part and a flow mixing cap. The tank body includes holding space and a gas input hole in communication with the holding space. The nozzle is arranged at the bottom of the tank body. The flow mixing element incudes an ascending pipe, a descending pipe and a mixing chamber. The flow mixing element is arranged in the holding space. The mixing chamber is provided with an opening, the top of the ascending pipe communicates with the mixing chamber, the bottom of the ascending pipe is provided with a liquid inlet communicated with the holding space. The descending pipe is at least partly arranged in the holding space. The top of the descending pipe communicates with the mixing chamber. The bottom of the second pipe part connects to an outlet through the tank body. The flow mixing chamber opening is covered by a mixing cap is provided with a gas intake connecting the holding space with the mixing chamber. A gas injection volume and gas mixing degree can be adjusted by replacing the flow mixing cap with another flow mixing cap having a gas intake hole with different cross-sectional area.

A gas infusion tank for a beverage machine includes a tank body defining a holding space for accommodating beverages. A mixing element includes a mixing chamber, an ascending pipe, and a descending pipe. A top of the ascending pipe is fluidly connected to the mixing chamber and a bottom of the ascending pipe has a liquid inlet. The liquid inlet is fluidly connected to the holding space. A top of the descending pipe is fluidly connected to the mixing chamber and a bottom of the descending pipe includes a liquid outlet in fluid communication with the nozzle. A gas intake hole connects the holding space with the mixing chamber.

A tank body defines a holding space for accommodating beverages received through a liquid inlet. A gas inlet hole receives gas into the holding space. A nozzle is arranged on the bottom of the tank body. A flow mixing part is arranged in the holding space and is provided with a mixing chamber with an opening. An ascending pipe is arranged in the holding space. The ascending pipe communicates with the mixing chamber. The bottom of the ascending pipe is provided with a liquid inlet. The liquid inlet communicates with the holding space. A descending pipe is at least partially disposed in the holding space. The top of the descending pipe communicates with the mixing chamber. The bottom of the descending pipe is provided with a liquid outlet. The liquid outlet communicates with the nozzle. A mixing cap is detachably connected to the mixing chamber at the opening of the mixing chamber. The mixing cap is provided a gas intake hole to connect the holding space with the mixing chamber.

As disclosed herein, gas and beverage are received in the tank and the gas and beverage can be effectively mixed in the mixing chamber of the mixing part, so that the beverage mixed with gas can be dispensed from the tank. Additionally the gas volume and mixing degree is controllable and adjustable.

Optionally, the cross-sectional area of the gas intake is smaller than the opening area of the liquid inlet. Optionally, the flow mixing cap includes a blocking portion and a connecting portion connected to the blocking portion, and the blocking portion is arranged in the flow mixing chamber. Optionally, the blocking portion is configured in a plate shape, and the connecting portion is configured to extend outward from an outer peripheral edge of the blocking portion. Optionally, an ascending pipe and a descending pipe are arranged side-by-side and vertically, and at least one of the ascending pipe and the descending pipe is integrally formed with the flow mixing part. Optionally, the mixing part has a first hole communicating with the ascending pipe and a hole communicating with the descending pipe. The cross-sectional area of the holes are smaller than the respective cross-sectional areas of the inner surface of the two pipes. Optionally, the nozzle is detachably arranged at the bottom of the tank body, the nozzle includes a nozzle body and a nozzle core arranged in the nozzle body. An outlet is provided at the bottom end of the nozzle body. A plurality of jet holes are provided on the nozzle core and the plurality of jet holes communicate with the outlet.

The nozzle core optionally includes a plurality of extension parts configured to extend radially outward from an axis of the nozzle core. An outer peripheral surface of the first extension part abuts against the inner surface of the nozzle body. The outer peripheral surface of the second extension part and the outer peripheral surface of the third extension part have gaps to the inner surface of the nozzle body. A plurality of jet holes are arranged through the first extension part.

Optionally, the bottom of the tank is provided with a mounting part. The bottom end of the second pipe part is inserted into the installation part, the top end of the nozzle body is sleeved on the outside of the mounting part, and the center of the mounting part is provided with at least one flow-limiting hole, and the at least one flow limiting hole is respectively communicated with the liquid outlet and the jet hole. The cross-sectional area of the restricted flow hole is smaller than the cross-sectional area of the inner surface of the descending pipe. The bottom end of the descending pipe may extend through the mounting portion and into the nozzle body. Optionally, the tank body includes a tank body with a top opening and a gas input hole is set on the cover. The outer surface of the tank body is provided with a protrusion. The cover is provided with a groove. The tank body is connected to the cover by rotating into the groove through the protrusion.

The beverage machine may further include a first sealing ring. The first sealing ring is sandwiched between the tank body and the cover along the circumference of the tank body. A second sealing ring may be interposed between the mixing part and the mixing cap along the circumferential direction of the opening. One of the tank body and the cover may be provided with a magnet. The other of the tank body and the cover may be provided with a magnetic sensor. The magnetic sensor detects the magnetic field of the magnet to detect whether the cover is installed in place relative to the tank body.

BRIEF DESCRIPTION OF THE DRAWINGS

The following drawings of the application are hereby considered as part of the disclosure for understanding the disclosure. The following drawings and corresponding description thereof present non-limiting examples of embodiments of the present disclosure.

BRIEF DESCRIPTION OF REFERENCE NUMERALS OF THE DRAWINGS

Figure 1:
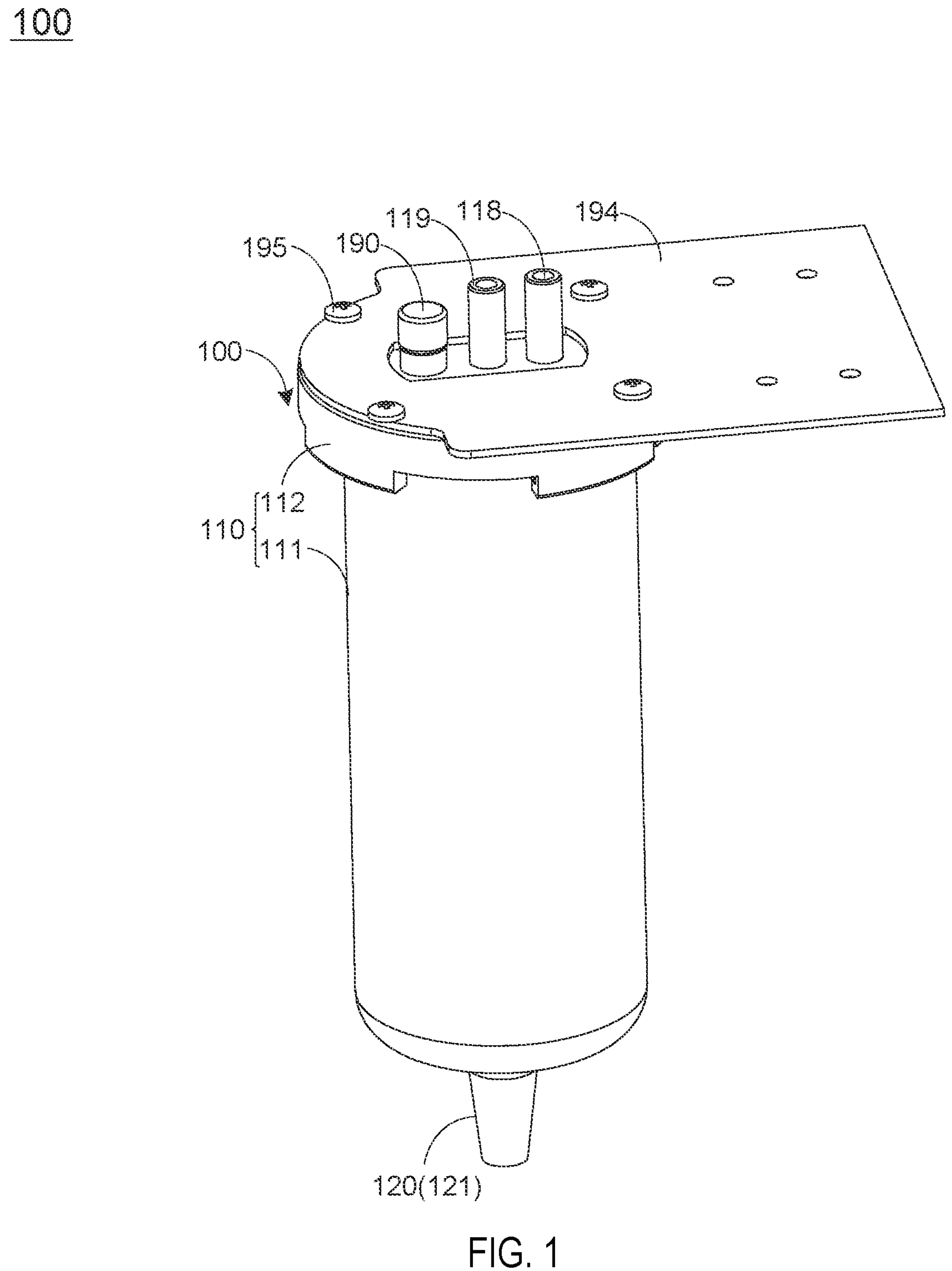
FIG. 1 is a perspective view of a gas infusion tank for a beverage machine.

100: beverage machine
110/210: gas infusion tank
111/211: tank body
112: cover
113: protrusion
114: groove
115/215: holding space
116/216: mounting part
117: flow restricted hole
118: gas inlet
119: liquid inlet
120/220: nozzle
121/221: nozzle body
122/222: nozzle core
124: jet hole
125: first extension
126: second extension
127: third extension
128/228: outlet
130/230: mixing element
131: chamber wall
132/232: ascending pipe
133/233: descending pipe
134/234: pipe inlet
135/235: liquid outlet
136: hole
137: hole
138: mixing chamber
139: opening
140: mixing cap
141: blocking portion
142: connecting portion
143: gas intake hole
144: surface
145: top opening
146/246: end
150: sealing ring
152: annular groove
155: space
160: sealing ring
162: annular groove
170: magnet
172: central axis
174: first valve seat
176: second valve seat
178: reduced-radius portion
180: magnetic sensor
182: gap
190: pressure sensor
191: annular wall
192: transverse wall
193: sprayer
194: bracket
195: fasteners
196: exterior annular wall
263: hole
265: flange
266: shaft extension
267: sealing ring

DETAILED DISCLOSURE

In the following description, numerous specific details are given in order to provide a more thorough understanding of the application. It will be apparent, however, to one skilled in the art that the present application may be practiced without one or more of these details. In other examples, some technical features known in the art are not described in order to avoid confusion with the present application. The preferred embodiments of the application are described in detail below, however, the present disclosure may have other embodiments in addition to those specifically described that are within the scope of the present disclosure.

It should be noted that the terms used here are only used to describe specific embodiments, and it is not intended to limit the exemplary embodiments according to the present application. Singular forms are also intended to include plural forms. In addition, it should also be understood that when the terms “comprises” and/or “comprises” are used in this specification, it indicates the presence of the features, integers, steps, operations, elements and/or components, but does not exclude the presence or addition of one or more other features, integers, steps, operations, components, components and/or their combinations. The ordinal numbers such as "first" and "second" are only identifications, and do not have any other meaning, such as a specific order, etc. Also, for example, the term "first element" itself does not imply the existence of a "second element", and the term "second element" itself does not imply the existence of a "first element". It should be noted that the terms "vertical," "upward," "downward," "above," "below," "upper," "lower," "ascending," "descending," "front," "rear," "left," "right," "inner," "outer," and similar expressions are for purposes of illustration only and not limitation.

Exemplary embodiments according to the present disclosure will be described in more detail with reference to the accompanying drawings. These example embodiments may, however, be embodied in many different forms and should not be construed as limited to only the embodiments set forth herein. This disclosure is intended to be thorough and complete and will fully convey the concept of these exemplary embodiments to those of ordinary skill in the art.

The present disclosure provides a beverage machine with a gas infusion system capable of efficiently mixing gas and a beverage. The mixed gas may include but not limited to food-grade nitrogen, carbon dioxide, air, or their mixed gases. Mixed beverages may include, but are not limited to gasified water, soft drinks, juice, coffee, or tea.

Figure 2:
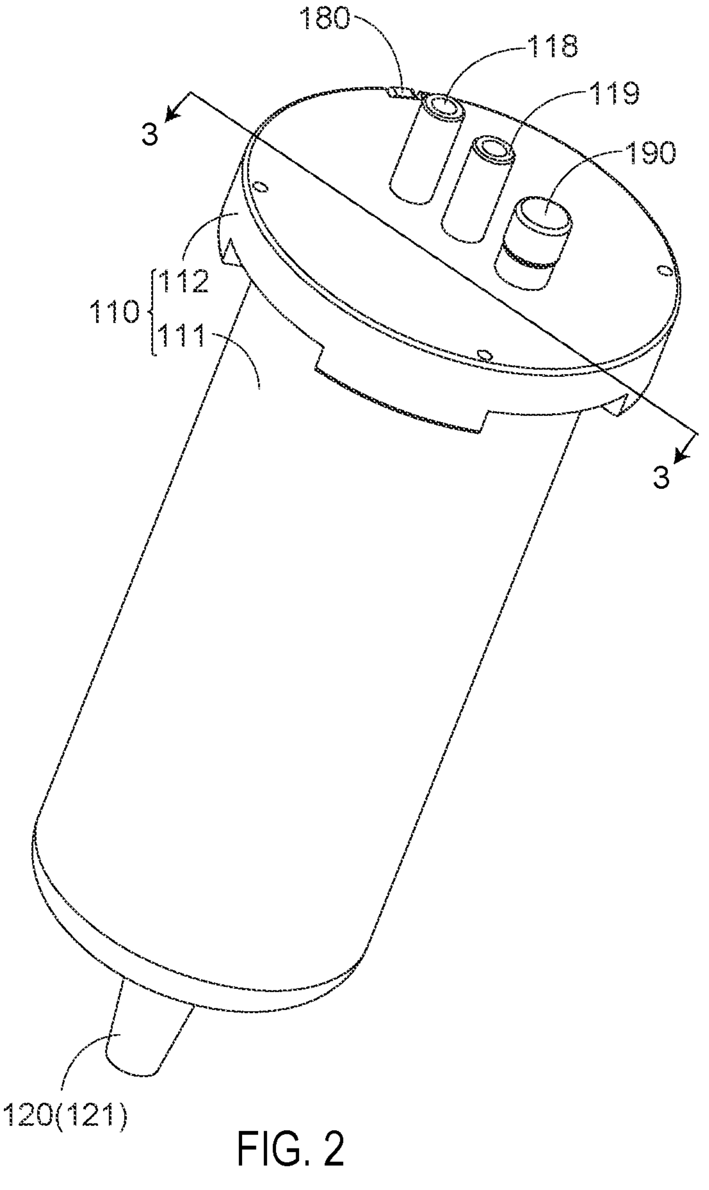
FIG. 2 is a perspective view of the gas infusion tank without the brackets and fasteners of the beverage machine.

FIG. 1 depicts a perspective view of a gas infusion tank 110 for a beverage machine 100. FIG. 2 is a perspective view of the isolated gas infusion tank 110. The beverage machine 100, while not shown in entirety may exemplarily be a dispenser of gasified coffee or tea, or a dispenser of gasified soft drink beverages, or other beverage machines as will be recognized by a person of ordinary skill in the art. As depicted in FIG. 1, a bracket 194, for example in the structure of a plate, supports the gas infusion tank 110 within the beverage machine 100, the gas infusion tank 110 may be connected to the bracket 194 exemplarily with a series of fasteners 195, for example screws. The gas infusion tank 110 includes a tank body 111. The tank body 111 has a generally cylindrical shape that generally extends vertically, although it will be recognized that the gas infusion tank may be oriented in other directions including, but not limited to, horizontal or angled. The tank body 111 has a top opening 145 and a cover 112 is removably secured to the tank body 111 to cover the top opening 145. The gas infusion tank further includes a nozzle 120 is located at an end 146 of the gas infusion tank 110 opposite the top opening 145. The gas infused beverage is dispensed through the nozzle 120. The gas infusion tank 110 also includes a mixing element 130 and a mixing cap 140, as will be described in further detail herein.

Figure 5:
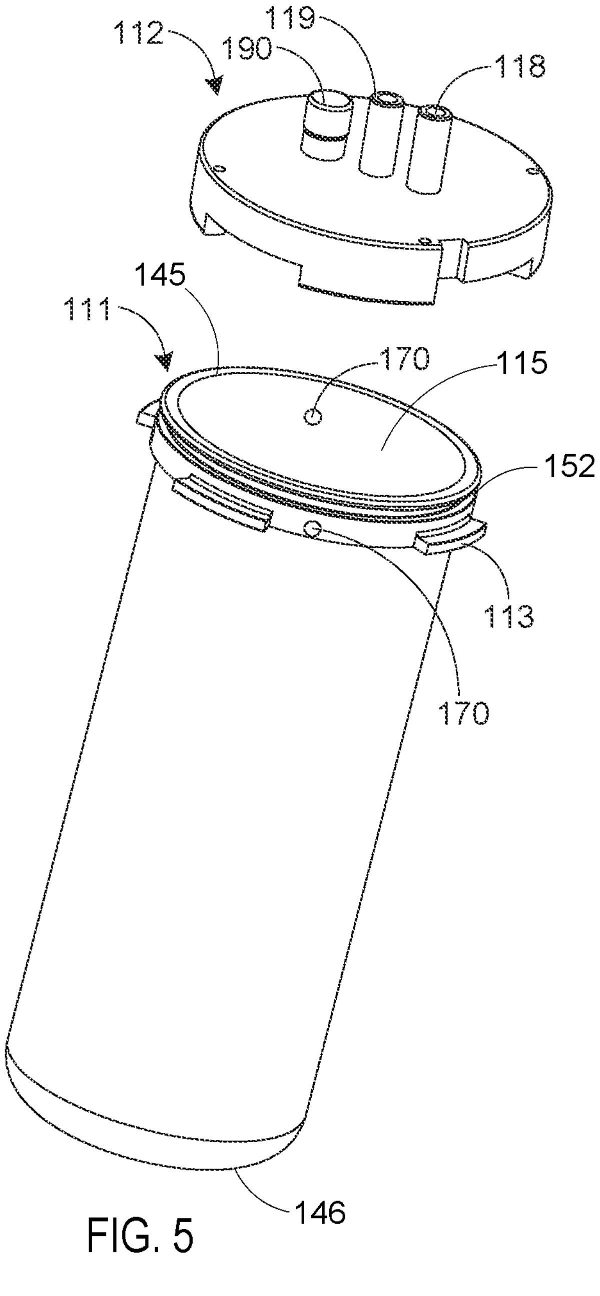
FIG. 5 is a perspective exploded view of the gas infusion tank of FIG. 2.
Figure 6:
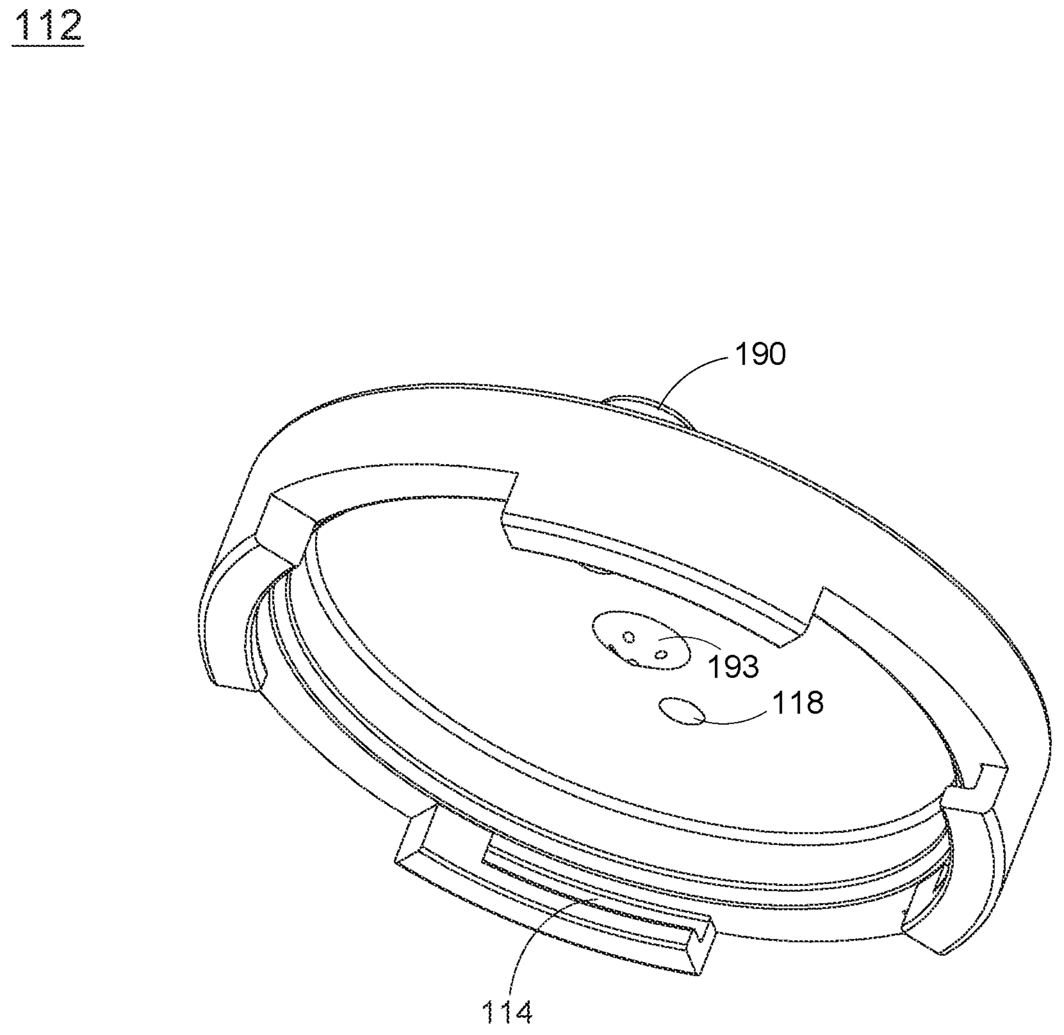
FIG. 6 is a bottom perspective view of the cover of the gas infusion tank.

The gas infusion tank 110 defines a holding space 115 into which the liquid and the gas are received. FIG. 5 depicts the gas infusion tank 110 in exploded view and FIG. 6 is a bottom perspective view of the cover 112. The tank body 111 includes a protrusion 113 provided on an exterior surface of the tank body 111 at or near the top opening 145. The cover 112 is provided with a groove 114 on an internal surface thereof, and provides for a screw or bayonet fit between the cover 112 and the tank body 111. While a single groove 114 and protrusion 113 are depicted, it is recognized that other number or configurations of similar interconnection structures may be provided on the cover 112 and the tank body 111, including reversing the location of such interconnection structures between these components. In a still further example, the tank body 111 is provided with at least one magnet 170, for example as shown in FIG. 5, and the cover 112 provided with at least one magnetic sensor 180, for example as shown in FIG. 2. The magnetic sensor 180 operates to detect one or more of the magnets 170 in the tank body 111. The magnetic field of the one or more magnets 170 is detected by the magnetic sensor 180 to confirm proper installation of the cover 112 on the tank body 111. When proper installation is confirmed, no further follow process or confirmation is needed. Examples may include the same number of magnets 170 as magnetic sensors 180 and other examples may include more magnets 170 than magnetic sensors 180. It will also be recognized that the one or more magnets 170 may be located in the cover 112 and the one or more magnetic sensors 180 may be located in the tank body 111. The magnets 170 and/or the magnetic sensors 180 may further be located within the protrusion 113 and/or groove 114.

The cover 112 includes a gas inlet 118 through which the gas is provided to the holding space 115. The gas inlet 118 is connected to an upstream gas source (not depicted) which may be a part of the beverage machine 100. The upstream gas source may be a pressurized and controlled by a valve (not depicted) for dispensing the gas into the gas infusion tank 110. The gas of the gas source may be nitrogen, carbon dioxide, air, or another mixture of gasses. The cover 112 further includes a pressure sensor 190 that is open to the holding space 115 of the gas infusion tank 110. Pressure readings from the pressure sensor may be used by the beverage machine 100 control of the operation and use of the gas infusion tank 110, including but not limited to low pressure warning, gas input control, or emergency fault conditions.

The cover 112 further includes a liquid inlet 119 through which the liquid is provided to the holding space 115. The liquid inlet 119 is connected to an upstream liquid source (not depicted) which may be a part of the beverage machine 100. The upstream liquid source may be a source of water, pre-mixed water and concentrate, coffee, tea, juice and may be controlled by a valve (not depicted) for dispensing the liquid into the gas infusion tank 110. The liquid inlet 119 is connected to a sprayer 193 with a plurality of holes to the holding space 115. In examples, the sprayer 193 includes fewer than three, three, four, five, six, seven, or more than seven holes. The liquid inlet 119 and sprayer 193 is exemplarily centrally located within the cover 112 and aligned along an axis of the gas infusion tank 110.

In a further example, the liquid inlet 119 and sprayer 193 may be used to clean the holding space 115 between uses or gasification cycles. In an example, a cleaning operation may include circulating clean water from the sprayer 193 through the holding space 115 and the nozzle 120. In still further examples, the liquid inlet 119 by be selectively or alternatively connected to a source of cleaning solution, which may include, but is not limited to, a source of clean water, for cleaning the holding space 115 in a cleaning operation.

A sealing ring 150 is disposed within an annular groove 152 in an exterior of the tank body 111. The sealing ring 150 is sandwiched between the tank body 111 and the cover 112 to form a circumferential seal therebetween, isolating the holding space 155 to prevent gas or liquid leakage through any gap in the interface between the tank body 111 and the cover 112.

Figure 3:
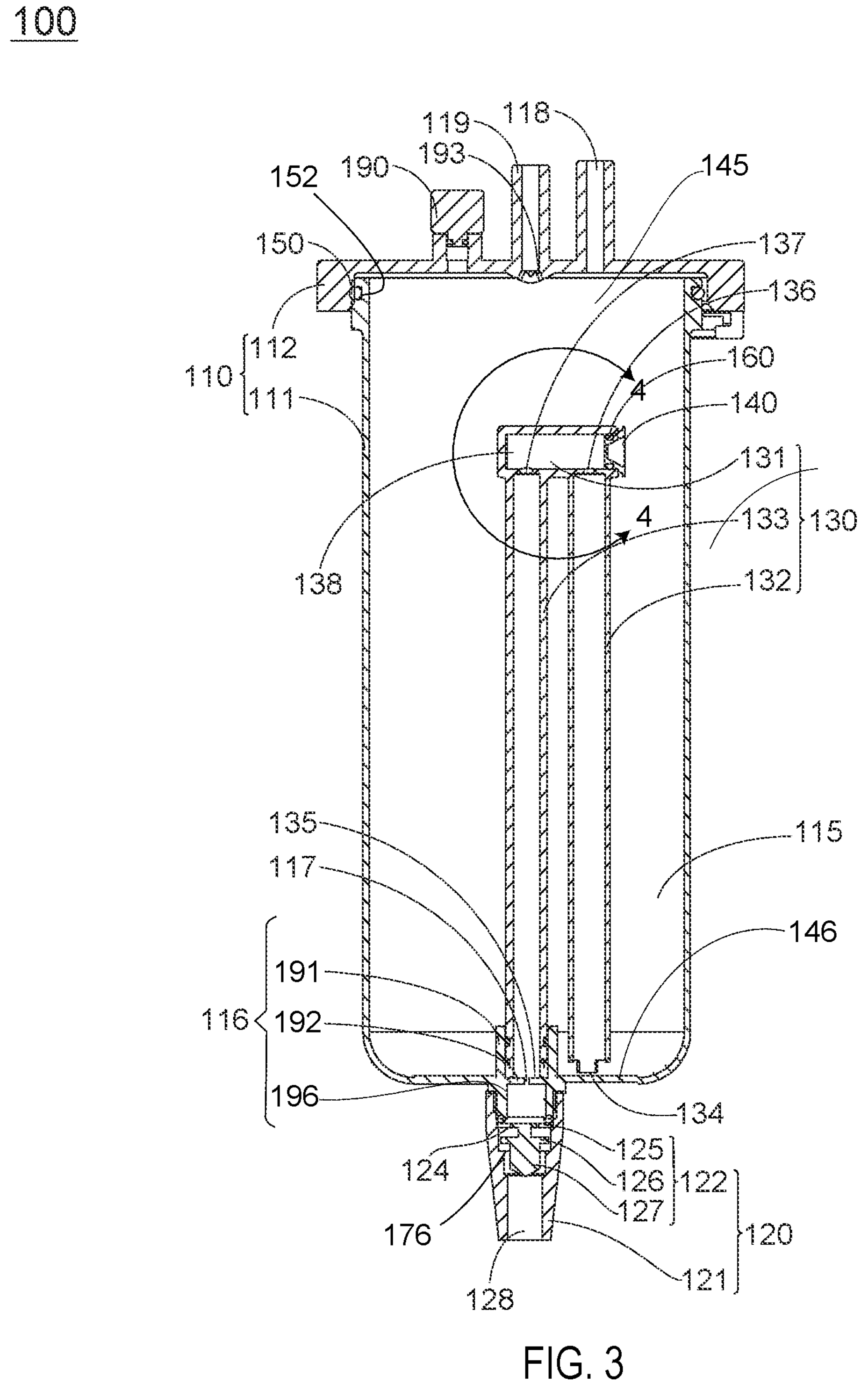
FIG. 3 is a cross-sectional view of the gas infusion tank as taken along line 3-3 of FIG. 2.
Figure 4:
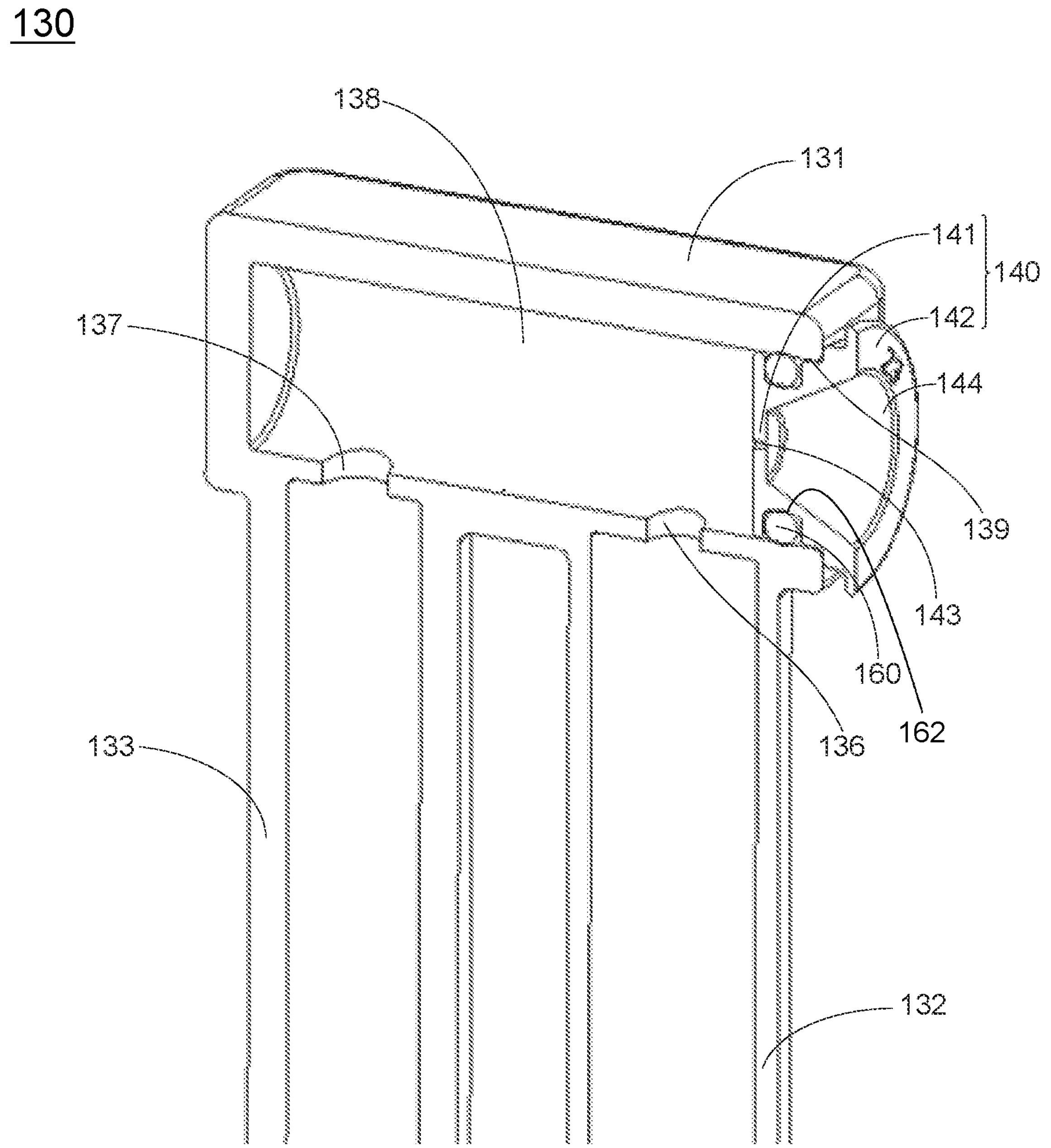
FIG. 4 is a detailed perspective cross-sectional view of portion 4-4 of the gas infusion tank of FIG. 3.

FIG. 3 is a cross-sectional view of the gas infusion tank 110 taken along line 3-3 of FIG. 2. FIG. 4 is a detailed perspective cross-sectional view of portion 4-4 of the gas infusion tank 110 of FIG. 3. A mixing element 130 is disposed within the holding space 115 of the gas infusion tank 110. The mixing element 130 includes a mixing chamber 138 defined by a chamber wall 131. The mixing element 130 further includes an ascending pipe 132 fluidly connected to the mixing chamber 138 by a hole 136 through the chamber wall 131. The cross-sectional area of the outlet 135 is preferably smaller than the cross-sectional area of the ascending pipe 132. The ascending pipe 132 has a pipe inlet 134 that is open to the holding space 115. The pipe inlet 134 is located proximate to, but spaced apart from, the end 146 of the tank body 111. The spacing of the pipe inlet 134 from the bottom end 146 of the tank body 111 provides for fluid flow into the pipe inlet 134, while also maximizing evacuation and dispense of liquid from the holding space 115. The mixing element 130 further includes a descending pipe 133 fluidly connected to the mixing chamber 138 by a hole 137 through the chamber wall 131. The cross-sectional area of the hole 137 is preferably smaller than the cross-sectional area of the inner surface of the of the descending pipe 133. In a still further examples, the cross-sectional area of the hole 137 may be larger than the cross-sectional area of the hole 136. The cross-sectional area of the ascending pipe 132 may be larger than the cross-sectional area of the descending pipe 133. The descending pipe 133 ends in a liquid outlet 135 through the bottom end 146 of the tank body 111 into the nozzle 120. In examples, the mixing element 130 may be a unitary construction or may be constructed of separate components assembled together.

The mixing chamber 138 is open to one end, exemplarily at opening 139 through the chamber wall 131. The descending pipe 133 is exemplarily aligned along an axis of the gas infusion tank 110. A mixing cap 140 is seated within the opening 139 to generally occlude the opening 139 into the mixing chamber 138. The mixing cap 140 is exemplarily a separate piece and is detachably secured within the opening 139. In an example, the mixing cap 140 includes a blocking portion 141 that generally occludes the opening 139 and a connecting portion 142 that facilitates a resilient seal against gas or liquid flow between the mixing cap 140 and the chamber wall 131. The mixing cap 140 includes a sealing ring 160 is disposed within an annular groove 162 in the mixing cap 140.

The mixing cap 140 includes a gas intake hole 143 through the blocking portion 141 which permits the regulated flow of gas from the holding space 115 into the mixing chamber 138. The flow of gas through the gas intake hole 143 is dependent upon the pressure of the gas within the holding space 115 and the cross-sectional area of the gas intake hole 143. In examples, a plurality of interchangeable mixing caps 140 are provided, each mixing cap 140 having a gas intake hole 143 of varying cross-sectional area. The gas infusion tank 110 as disclosed herein in thus configurable by a user or technician to adjust a mixing ratio of gas and beverage by selection and replacement of the mixing cap 140 to select for the cross-sectional area of the gas intake hole 143 used. The gas intake hole 143 exemplarily has a cross-sectional area smaller than the pipe inlet 134 or that of the ascending pipe 132.

The gas intake hole 143 is exemplarily a circular through hole. As described above, a plurality of mixing caps 140 may be provided, with different sizes of gas intake holes 143. The air intake hole exemplarily has a diameter between 0.05 mm-0.5 mm, and for example, may be but not limited to 0.05 mm, 0.1 mm, 0.2 mm, 0.3 mm, 0.4 mm, or 0.5 mm. The diameter of the pipe inlet 134 may exemplarily be 4 mm-12 mm, for example, the diameter may be 4 mm, 6 mm, 8 mm, 10 mm, or 12 mm. Mixing caps 140 with different diameter air intake holes may be marked for example by color coding, laser printing, engraving, molding, 3d printing etc, in order to identify the air intake hole diameter for selection.

During use, the holding space 115 receives liquid from the liquid inlet 119 and gas from the gas inlet 118. The liquid, being heavier than the gas, settles in the bottom of the holding space 115, filling the holding space 115 from the bottom up. In use, the gas infusion tank 110 is configured with dimensions of the holding space 115 such that volumes of liquid associated with beverages to be dispensed from the beverage dispenser is held in the holding space at a level below the gas intake hole 143. That is, a liquid surface-gas interface 164 is present within the holding space 115 at a position generally below the gas intake hole 143. In a batch operation, the volume of liquid for the beverage is provided into the holding space 115. Then the gas is provided through the gas inlet 118. The pressure within the holding space 115 of the gas infusion tank 110 is dependent upon the pressure to which the gas source is regulated. Gas flow from the holding space 115 through the gas intake hole 143 into the mixing chamber 138 depends upon the pressure difference between the mixing chamber 138 and the holding space 115 and the cross-sectional area of the gas intake hole 143, as discussed above.

Pressure outside of the nozzle 120 is less than the pressure within the holding space 115. The pressure outside of the nozzle 120 may be ambient, for example in a case where a receptacle is placed below the nozzle 120 to collect the gasified liquid for consumption. The pressure within the holding space 115 forces the liquid through the pipe inlet 134, up the ascending pipe 132 and through the hole 136 into the mixing chamber 138. Gas additionally flows through the gas intake hole 143 directly into the mixing chamber 138 coming into contact with the liquid flowing through hole 136 and mixing with the liquid in the mixing chamber 138 to gasify the liquid to form a gas-mixed beverage. The gas-mixed beverage flows out of the mixing chamber 138 through hole 137 into descending pipe 133 and through the liquid outlet 135 and the nozzle 120.

The cross-sectional area of the hole 136 is exemplarily smaller than a cross-sectional area of either the ascending pipe 132 or the pipe inlet 134. The liquid, when forced through the hole 136 forms a jet, sprays, and/or atomizes from the hole 136. The gas through the gas intake hole 143 similarly forms a jet of the gas therethrough. The liquid from the hole 136 and the gas from the gas intake hole 143 are thus on generally orthogonal paths, exemplarily colliding within the mixing chamber 138. The hole 137 is exemplarily larger than the hole 136 in a cross-sectional area so as to permit the combined liquid and gas mixture to exit the mixing chamber 138 with a reduced pressure drop across the hole 137.

Specifically referring to FIG. 4 and as noted above, the mixing cap 140 includes the blocking portion 141 and the connecting portion 142. The blocking portion 141 generally occludes the opening 139 to the mixing chamber 138, when the mixing cap is positioned within the opening 139. The connecting portion 142 facilitates the fluid-tight engagement between the mixing cap 140 and the chamber wall 131, while also facilitating installation and removal of the mixing cap 140, for example, for selective replacement of the mixing cap 140. The blocking portion 141 is exemplarily constructed as a plate and the connecting portion 142 extends outward from the blocking portion 141, exemplarily in a frusto-conical shape defined by surface 144. Persons of ordinary skill in the art will recognized that the specific shapes of the blocking portion 141 and the connecting portion 142 may take other forms than those as specifically shown and described in the present application, and will similarly recognize other suitable shapes within the scope of the present disclosure. In a non-limiting example, the connecting portion 142 may take a more cylindrical shape while remaining within the scope of the present disclosure. The exemplary small end of the connecting portion 142 connects to the blocking portion 141 surrounding the gas intake hole 143, which is exemplarily axially centered on the blocking portion 141 and the surface 144. This also axially aligns the gas intake hole 143 with the mixing chamber 138 such that gas from the holding space 115 is injected along the central axis of the mixing chamber 138.

As noted above, the mixing caps 140 may be within a set of mixing caps with different sized orifices, the mixing caps 140 being selectable to control the gasification of the liquid beverage. The mixing caps 140 described above connected to the mixing chamber 138 with a friction fit. In still other examples, the interchangeable mixing caps 140 may be connected to the mixing chamber by screw fit, bayonet, or secured by mechanical fasteners, including, but not limited to latches or screws. In another example, the exterior of the gas infusion tank 110, the bracket 194, or another component of the beverage machine 100 may include a mount configured to hold the plurality of interchangeable mixing caps 140. The mount may be resilient and deform slightly to retain the separate mixing caps within respective apertures, projections, or between resilient fingers. The mount may include size/flow/gas ratings to inform a user regarding the properties of an associated mixing cap retained at a specific position. In a still further example, the set of interchangeable mixing caps 140 are connected together by a tether. The tether may exemplarily be elastomeric, metal, or natural or synthetic fibers, the tether may retain all of the mixing caps 140 of the set together, so that a user or technician always has access to all of the mixing caps for reconfiguration of the gas infusion tank 110.

In still other examples, the gas intake hole 143 of the mixing cap 140 may be an adjustable orifice. The orifice may exemplarily be mechanical or electrical such that the orifice size is adjustable without replacing the mixing cap 140 for another mixing cap. Mixing cap 140 with an adjustable orifice may include a pressure regulator, a needle valve, a proportional solenoid valve, a ceramic valve, or others which would be recognized by a person of ordinary skill in the are in view of the present disclosure.

Referring now to FIG. 3, the nozzle 120 extends outwards from the tank body 111 of the gas infusion tank 110. As noted above, the nozzle 120 controls the dispense of gasified liquid beverage from the gas infusion tank 110. The nozzle 120 is exemplarily detachably connected to the tank body 111. The nozzle 120 includes a nozzle body 121 that is exemplarily cylindrically shaped, and in another embodiment is a frusto-conical cylinder. The bottom or lower end of the nozzle body 121 defines a pour outlet 128 through which the gasified liquid beverage is dispensed.

The tank body 111 includes a mounting part 116 at the bottom end 146 thereof. The mounting part 116 includes an interior annular wall 191 and an exterior annular wall 196. The interior annular wall 191 and the exterior annular wall 196 are separated by a transverse wall 192 extending transverse and internal to the interior annular wall 191 and the exterior annular wall 196. A restricted flow hole 117 through the transverse wall 192 provides fluid communication exterior of the gas infusion tank 110 through liquid outlet 135. The descending pipe 133 is configured to be resiliently received coaxially within the interior annular wall 191. The engagement of the descending pipe 133 with the interior annular wall 191 is the point of connection between the tank body 111 and the mixing element 130, thus the mixing element 130 is exemplarily held within the holding space 115 by the resilient interface between the descending pipe 133 and the interior annular wall 191. The exterior annular wall 196 is exemplarily received within the interior of the nozzle 120 in an open end of the nozzle 120 opposite the pour outlet. The cross-sectional area of the restricted flow hole 117 is exemplarily smaller than the interior cross-sectional area of the descending pipe 133 and thereby limits the flow rate of the gasified liquid beverage out of the descending pipe 133 into the nozzle to provide stable output flow resistance/flow rate, which has been found to improve the mixing and/or foaming properties of a dispensed gasified liquid beverage.

Figure 7:
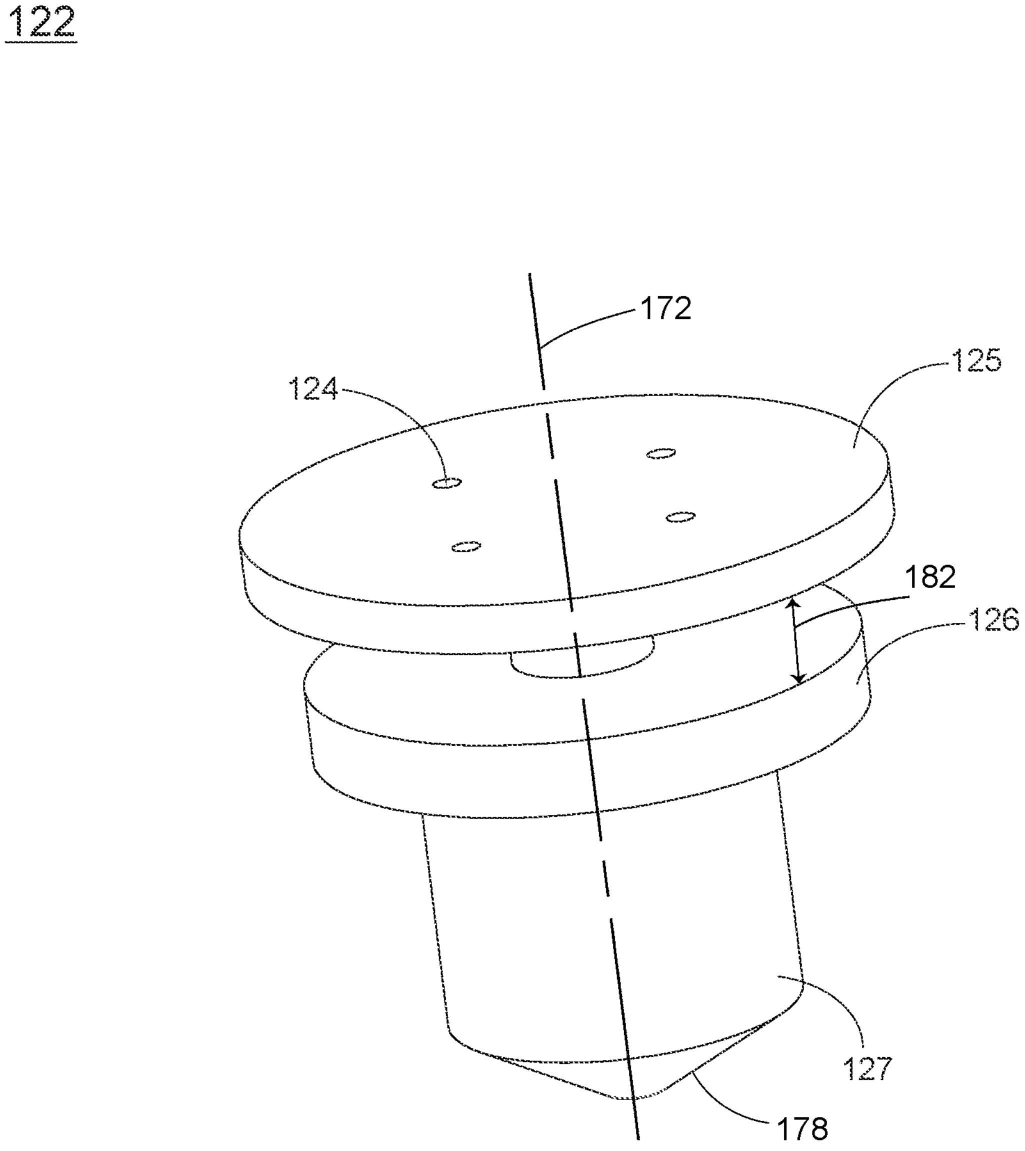
FIG. 7 is an isolated perspective view of a core of a valve for the gas infusion tank.

The nozzle body 121 defines a hollow interior in which various components reside, as described herein. A nozzle core 122 is co-axially positioned within the hollow interior of the nozzle body. FIG. 7 is an isolated perspective view of a nozzle core 122 of the nozzle 120 for the gas infusion tank 110. The nozzle core 122 has a central axis 172 and includes a plurality of extensions that generally extend radially outward from the central axis 172. The nozzle core 122 includes a first extension 125 that exemplarily defines an upstream end of the nozzle core 122. With the fluid connection between the nozzle 120 to the mounting part 116, the nozzle 120 receives the gasified liquid beverage from the liquid outlet in the direction of the nozzle core 122. The first extension 125 include a plurality of jet holes 124 therethrough which are provided to allow the gasified liquid beverage to pass through. The multiple jet holes 124 in the first extension interrupts the flow both of the gasified liquid beverage which may cause aeration of the beverage just prior to dispense through the outlet 128.

The first extension 125 and the second extension 126 are exemplarily in the shape of plates or radially extending surfaces, and are separated by gap 182. It is recognized that the first extension 125 may have a larger radius than the second extension 126, the first extension being configured to be seated between a first valve seat 174 and the exterior annular wall 196. The second extension 126 is configured to be positioned interior of an interior wall of the nozzle body 121 and spaced apart from a second valve seat 176 to provide a flow path past the second extension 126. The third extension 127 is columnar in shaped extending downstream from the second extension a distance greater than a diameter of the third extension 127. The third extension may further include a reduced-radius portion 178 in the exemplary form of a step or cone.

While the mixing element 130 is shown in FIG. 3 as being central to the tank body 111, in other examples, the mixing element 130 may be located at other positions. The mixing element 130 may be located radially towards the tank body, or at the tank body 111 to one side of the holding space 115. In a still further example, the mixing element 130 may be in part or in whole located exterior of the tank body 111 from the holding space 115. In such an example, the pipe inlet 134 extends through the tank body 111 at the bottom 146 or at the lower end of the side wall of the tank body 111. The ascending pipe 132 exemplarily extends along the outside of the tank body 111, and the mixing cap 140 is exemplarily positioned within another hole through the tank body 111. This arrangement facilitates the selection and swapping of mixing caps 140 with varying sized gas intake holes 143. In another example, the entire mixing element may be replaceable, as the sizes of the gas intake hole 143, and holes 136 and 137 may be dimensioned for a particular beverage, for example, liquid viscosity, gas composition, and gas infusion amount. Relatedly, the mixing chamber 138, whether integrated with the mixing cap 140 or not, may be replaceable with mixing chambers 138 having various sizes and size combinations of the diameter of these orifices. Understanding the relationship between the gas orifice 143, the liquid orifice 136 and the combined output orifice 137, replacement components simultaneously changing one, two, or all three of these orifice diameters may be provided. While such examples may be used with the mixing element 130 located within the tank body 111, the placement of the mixing element 130 outside of the tank body 111 promotes ease in servicing, cleaning, or changing components of the mixing element.

The nozzle core 122 is mounted in the nozzle body 121. In the middle state, an outer peripheral surface of the first extension 125 abuts against the interior surface of the nozzle body 121. The outer peripheral surfaces of the second extension 126 and the third extension 127 leave a gap to the corresponding interior surface of the nozzle body 121. From the outlet 135 of the gas infusion tank 110, the gasified liquid beverage passes through the restricted flow hole 117 to the proximity of the first extension 125. The gasified liquid beverage then passes through the jet holes 124 through the first extension 125 into the gap 182 between the first extension 125 and the second extension 126. The gasified liquid beverage then passes through the gaps between the second extension and third extension 127 and the interior surface of the nozzle body 121 to the outlet 128.

In a still further example, the nozzles 120 may be interchangeable in a similar manner as the mixing caps noted above. The shape of the nozzle cores, the nozzle body interior, and/or the number and size of the jet holes through the first extension may be any of a variety of dimensions such as to control an output volumetric flow rate. As also noted, the structures of the nozzle 120 may further cause or inhibit breakout of the gas from the gasified liquid beverage. This controls foaming which may be desirable or undesirable dependent upon the gasified liquid beverage being produced. The nozzles 120 may be within a set of nozzles with different dimensions as noted above. A user/operator may select a nozzle from a plurality of nozzles to control output dispense of the gasified liquid beverage. In one non-limiting examples, a nozzle may be integrated with or attached to or attached with a receptacle for receipt of a particular type of beverage. The nozzle associated with the receptacle may be a nozzle having the dimensions and properties for the output dispense of the beverage to be received therein. In an example, the user attached the nozzle associated with the receptacle to the gas infusion tank 110 for the preparation and dispense of the intended gasified liquid beverage.

The nozzle 120 described above is connected to the gas infusion tank 110 with a friction fit. In still other examples, the nozzle(s) 120 may be connected to the mixing chamber by screw fit, bayonet, or secured by mechanical fasteners, including, but not limited to latches or screws. In another example, the exterior of the gas infusion tank 110, the bracket 194, or another component of the beverage machine 100 may include a mount configured to hold the plurality of interchangeable nozzles 120. The mount may be resilient and deform slightly to retain the separate mixing caps within respective apertures, projections, or between resilient fingers. The mount may include size/flow/gas ratings to inform a user regarding the properties of an associated nozzle retained at a specific position. In a still further example, the set of interchangeable nozzles 120 are connected together by a tether. The tether may exemplarily be elastomeric, metal, or natural or synthetic fibers, the tether may retain all of the nozzles 120 of the set together, so that a user or technician always has access to all of the mixing caps for reconfiguration of the gas infusion tank 110.

In still other examples, the nozzle 120 may be an adjustable orifice. The orifice may exemplarily be mechanical or electrical such that the orifice size is adjustable without replacing the nozzle 120 for another nozzle. Nozzles 120 with an adjustable orifice may include a pressure regulator, a needle valve, a proportional solenoid valve, a ceramic valve, or others which would be recognized by a person of ordinary skill in the art in view of the present disclosure.

The gas infusion tank 110 as described herein may further include features to control the flow of gasified liquid from the gas infusion tank. This may include a valve at the end of the nozzle 120 to open or close the nozzle 120 to fluid flow. Additionally, because the gas infusion tank may dispense the gasified liquid as a batch, with the gas pressure in the holding space 115 pushing the liquid into the pipe inlet 134 and the mixing element 130, until substantially all of the liquid has exited the holding space 115, below the pipe inlet 134. When the last of the liquid exits the nozzle 120, the holding space experiences a rapid pressure drop as the holding space 115 is exposed to the ambient pressure outside of the nozzle, this coincides with an increase in the gas flow rate out of the nozzle 120. Either of these measurands may be sensed by an corresponding electrical or mechanical sensor placed for example, at the nozzle 120, in the mixing element 130, in the holding space 115, or at the gas inlet 118, although other locations may be recognized by a person of ordinary skill in the art and be within the scope of the present disclosure. In response to the detection of one of these conditions indicating that the holding space 115 is empty, one or more valves (for example at the nozzle 120, at the gas inlet 118, or at the gas source) may be closed to end the dispense and to conserve gas.

Figure 8:
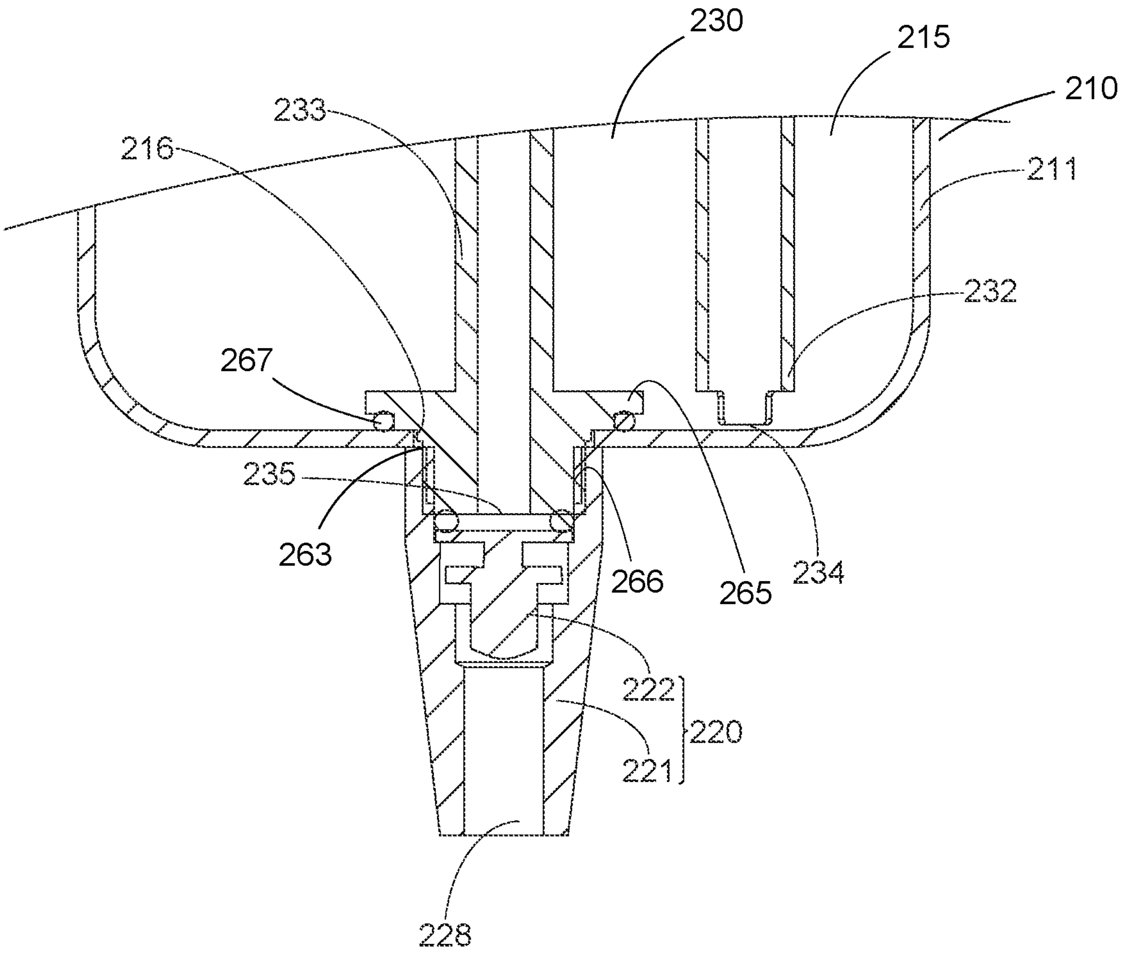
FIG. 8 is a detailed cross-sectional view of a portion of an example of a gas infusion tank.

FIG. 8 is a detailed cross-sectional view of a portion of an example of a gas infusion tank 210. It will be recognized that the components shown in FIG. 8 are labeled with corresponding "200" series numbers and that the corresponding description above similarly applies to the like components described with reference to FIG. 8. It is also recognized that features shown with reference to FIG. 8 may be use in combination with, in addition to, or in replacement of similar components described above with respect to FIGS. 1-7 while remaining within the scope of the present disclosure.

In FIG. 8 a further example of the interface between the descending pipe 233 and the nozzle 120 is provided. In FIG. 8, the mounting part 216 is provided as a hole 263 through the tank body 211 while the bottom end of the descending pipe 233 is provided with a flange 265 at the lower end. The flange 265 engages an interior surface of the tank body 211 at the bottom 246 of the tank body 211. A sealing ring 267 between the flange 265 and the tank body 211 provides a fluid and gas seal at this interface. A hollow shaft extension 266 extends exterior of the flange 265 and through the hole 263 and exterior of the tank body 211. The nozzle 220 resiliently receives the shaft extension 266 on the exterior of the tank body 211 to fluidly connect the nozzle 220 to the descending pipe 233 through outlet 235 and also to complete the fluid and gaseous seal about the hole 263. The tank body 211 is further sandwiched between the flange 265 and the nozzle 220 to secure the position of the descending pipe 233, and the rest of the mixing element 230 within the holding space 215.

The nozzle 220 is removably mounted to the bottom end of the descending pipe 233. The lower portion of the descending pipe is configured in shape to match that of the hole 263 of the mounting part 216. The hollow shaft extension 266 of the descending pipe 233 extends exterior of the tank body 211 to removably connect into the nozzle 220.

Further examples of the gas infusion tank 110/210 may be used in a system in which a single gas supply source is connected to multiple gas infusion tanks, each tank of which is connected to a source of a different liquid. The gas supply source provides dispensing pressure to each of the tanks for a beverage dispensing system capable of dispensing multiple beverages. In still further examples, a pressure regulator is positioned in-line between the gas supply source and the gas infusion tank 110/210. The pressure regulator may be operable to adjust a pressure setting of gas provided to the gas infusion tank 110/210. Since the gas pressurizes the gas infusion tank, the supply pressure into the gas infusion tank control the flow rate of the liquid out of the gas infusion tank and the flow rate of the gas through gas intake hole of the mixing cap, which relates to the ratio of gas infused in the gasified liquid beverage.

In related examples, the gas infusion tank may include either multiple gas inlets 118 each connected to a different source of gas or may include one gas inlet port connected to multiple sources of gas with supplies of different gasses, for example, one or more of air, nitrogen, or carbon dioxide. These gasses can be provided through the gas inlet port(s) to the holding space under different pressures. The resulting delivery of the multiple gasses creates a combined gas within the holding space, and which is entrained into the liquid by the gas infusion tank. The composition of the combined gas may be but is not limited to 70% $CO_2$/30% nitrogen, 60% $CO_2$/40% nitrogen, or 75% nitrogen/25% $CO_2$. In examples, the nitrogen content of the combined gas may be between 0-100% and the $CO_2$ content may be between 0-100%. Other gases may make up a balance of the combined gas that is not nitrogen or $CO_2$. In still further examples, the nitrogen content may be between 20%-80% while the $CO_2$ content may be between 20%-80%. In examples, a small pressure tube may be provided from each of the gas sources to the mixing chamber to provide a pressure differential feedback for control of the gas composition in the combined gas.

In a still further system, a wye fitting connected to the liquid inlet 119, the wye fitting is controllable between at least one beverage source e.g. for tea, coffee, beer, juice, water, and at least one cleaning fluid source e.g. for water or water combined with e.g a soap, disinfectant, surfactant, chemical for cleaning the gas infusion system. In an example, during a manually initiated or automatically initiated cleaning or rinsing cycle, the wye fitting is controlled to permit a flow of the cleaning fluid into and through the gas infusion tank, wherein the cleaning fluid can wash the tank, and the mixing cap, the mixing system, and the nozzle. In examples, the cleaning/rinsing cycle may not be for cleaning purposes, but to rinse to prevent or reduce flavor cross contamination between the dispense of different liquid beverages as noted above.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas infusion tank for a beverage machine, the gas infusion tank comprising:

a tank body defining a holding space for accommodating beverages;

a nozzle;

a mixing element, the mixing element comprising:

a mixing chamber;

an ascending pipe, a top of the ascending pipe fluidly connected to the mixing chamber and a bottom of the ascending pipe having a liquid inlet, and the liquid inlet is fluidly connected to the holding space;

a descending pipe, a top of the descending pipe is fluidly connected to the mixing chamber and a bottom of the descending pipe comprises a liquid outlet in fluid communication with the nozzle; and a gas intake hole connecting the holding space with the mixing chamber;

wherein the mixing chamber comprises an opening and further comprising a mixing cap detachably connected to the mixing chamber at the opening of the mixing chamber, wherein the mixing cap releasably covers the opening, the mixing cap comprising the gas intake hole; and wherein the mixing cap is one mixing cap of a plurality of mixing caps, each configured to be detachably secured to the mixing chamber at the opening of the mixing chamber, wherein each mixing cap of the plurality of mixing caps comprises a gas intake hole of a different cross-sectional area than the gas intake holes of the other mixing caps of the plurality of mixing caps.

2. The gas infusion tank of claim 1 wherein the ascending pipe is fluidly connected to the mixing chamber through a liquid hole, and a cross-sectional area of the gas intake hole and a cross-sectional area of the liquid hole are both smaller than a cross-sectional area of the liquid inlet.

3. The gas infusion tank of claim 1 wherein the ascending pipe and the descending pipe are arranged vertically side by side, and at least one of the ascending pipe and the descending pipe are integrally formed with the mixing chamber.

4. The gas infusion tank of claim 1 wherein the mixing chamber is defined by a chamber wall, a first hole through the chamber wall provides fluid communication between the top of the ascending pipe and the mixing chamber, and a second hole through the chamber wall provides fluid communication between the mixing chamber and the top of the descending pipe, wherein a cross-sectional area of the first hole is smaller than a cross-sectional area of the inner surface of the ascending pipe, and a cross-sectional area of the second hole is smaller than a cross-sectional area of an inner surface of the descending pipe.

5. The gas infusion tank of claim 1 wherein the mixing cap includes a blocking portion and a connecting portion connected to the blocking portion, the blocking portion is arranged in the mixing chamber to block the opening, the connecting portion is at least partially located outside the mixing chamber, and the gas intake hole is arranged in the blocking portion.

6. A gas infusion tank for a beverage machine, the gas infusion tank comprising:
- a tank body defining a holding space for accommodating beverages;
- a nozzle;
- a mixing element, the mixing element comprising:
  - a mixing chamber;
  - an ascending pipe, a top of the ascending pipe fluidly connected to the mixing chamber and a bottom of the ascending pipe having a liquid inlet, and the liquid inlet is fluidly connected to the holding space;
  - a descending pipe, a top of the descending pipe is fluidly connected to the mixing chamber and a bottom of the descending pipe comprises a liquid outlet in fluid communication with the nozzle; and
- a gas intake hole connecting the holding space with the mixing chamber;
- wherein the mixing element is exterior of the tank body, and wherein the liquid inlet is fluidly connected to the holding space through the tank body and the gas intake hole is fluidly connected to the holding space through the tank body.

7. The gas infusion tank of claim 1 wherein the ascending pipe is fluidly connected to the mixing chamber through a first hole, the descending pipe is fluidly connected to the mixing chamber through a second hole and a cross-sectional area of at least two of the first hole, the second hole and the gas intake hole are adjustable.

8. The gas infusion tank of claim 7, wherein the cross-sectional area of at least two of the first hole, the second hole, and the gas intake hole are adjustable by replacement of at least a portion of the mixing element.

9. The gas infusion tank of claim 1, wherein the gas intake hole has an adjustable cross-sectional area.

10. The gas infusion tank of claim 1, wherein the nozzle is detachably arranged at the bottom of the tank body, the nozzle comprises a nozzle body and a nozzle core arranged in the nozzle body, and a bottom end of the nozzle body is provided with a pour outlet.

11. The gas infusion tank of claim 10, wherein the nozzle core is provided with a plurality of jet holes and the nozzle fluidly communicates from the liquid outlet of the descending pipe to the pour outlet.

12. The gas infusion tank of claim 10, wherein the tank body further comprises a mounting part at the bottom of the tank body, wherein the bottom end of the descending pipe is connected to a top end of the mounting part and the nozzle is connected to a bottom end of the mounting part, and the mounting part comprises a restricting hole in the center of the mounting part, the restricting hole providing fluid communication through the mounting part, wherein a cross-sectional area of the restricting hole is smaller than a cross-sectional area of an inner surface of the descending pipe.

13. The gas infusion tank of claim 1 wherein the nozzle is one nozzle of a plurality of nozzles, each configured to be detachably secured at the bottom of the tank body.

14. The gas infusion tank of claim 1, wherein the tank body defines an opening and further comprising a cover secured over the opening wherein the cover further defines the holding space, the cover comprising a gas inlet through the cover into the holding space.

15. The gas infusion tank of claim 14, wherein the liquid inlet is a first liquid inlet and further comprising a second liquid inlet through the cover and into the holding space.

16. A beverage dispensing machine comprising:
- a gas infusion tank comprising:
  - a tank body defining a holding space for accommodating beverages;
  - a mixing element, the mixing element comprising:
    - a mixing chamber;
    - an ascending pipe fluidly connected to the holding space, a top of the ascending pipe fluidly connected to the mixing chamber and a bottom of the ascending pipe having a liquid inlet, and the liquid inlet is fluidly connected to the holding space; and
    - a descending pipe at least partially disposed in the holding space, a top of the descending pipe is fluidly connected to the mixing chamber and a bottom of the descending pipe comprises a liquid outlet;
- a nozzle fluidly connected to the liquid outlet;
  - a gas intake hole connecting the holding space with the mixing chamber; and
  - a cover connected to the tank body and further defining the holding space, the cover comprising a gas inlet through the cover into the holding space and a liquid inlet through the cover and into the holding space;
- a gas source connected to the gas inlet; and
  - a liquid source connected to the liquid inlet;
  - wherein the mixing chamber comprises an opening and further comprising a mixing cap detachably connected to the mixing chamber at the opening of the mixing chamber, wherein the mixing cap releasably covers the opening, the mixing cap comprising the gas intake hole; and
  - wherein the mixing cap is one mixing cap of a plurality of mixing caps, each configured to be detachably secured to the mixing chamber at the opening of the mixing chamber, wherein each mixing cap of the plurality of mixing caps comprises a gas intake hole of a different cross-sectional area than the gas intake holes of the other mixing caps of the plurality of mixing caps.

17. The beverage dispensing machine of claim 16, wherein the liquid inlet through the cover is a first liquid inlet through the cover and further comprising a second liquid inlet through the cover and into the holding space, wherein the liquid source is a first liquid source of a first liquid and further comprising a second liquid source of a second liquid connected to the second liquid inlet, wherein the first liquid is different from the second liquid.

18. The gas infusion tank of claim 1, wherein the mixing element is at least partially exterior of the tank body, and wherein the liquid inlet is fluidly connected to the holding space through the tank body and the gas intake hole is fluidly connected to the holding space through the tank body.

19. The gas infusion tank of claim 16, wherein the mixing element is at least partially exterior of the tank body, and wherein the liquid inlet is fluidly connected to the holding space through the tank body and the gas intake hole is fluidly connected to the holding space through the tank body.

* * * * *